United States Patent
Ek et al.

(10) Patent No.: US 10,723,874 B2
(45) Date of Patent: Jul. 28, 2020

(54) CROSSLINKABLE POLYOLEFIN COMPOSITION

(71) Applicant: BOREALIS AG, Vienna (AT)

(72) Inventors: Carl-Gustaf Ek, Vastra Frolunda (SE); Denis Yalalov, Kopmansgatan (SE); Jingbo Wang, Engerwitzdorf (AT); Markus Gahleitner, Neuhofren/Krems (AT); Klaus Bernreitner, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/466,888

(22) PCT Filed: Dec. 15, 2017

(86) PCT No.: PCT/EP2017/082945
§ 371 (c)(1),
(2) Date: Jun. 5, 2019

(87) PCT Pub. No.: WO2018/114633
PCT Pub. Date: Jun. 28, 2018

(65) Prior Publication Data
US 2020/0062939 A1    Feb. 27, 2020

(30) Foreign Application Priority Data
Dec. 22, 2016    (EP) .................................... 16206247

(51) Int. Cl.
| | | |
|---|---|---|
| C08L 51/06 | (2006.01) | |
| C08K 5/00 | (2006.01) | |
| C08K 5/54 | (2006.01) | |
| C08L 23/06 | (2006.01) | |
| C08L 23/12 | (2006.01) | |
| C08L 43/04 | (2006.01) | |
| C08F 230/08 | (2006.01) | |

(52) U.S. Cl.
CPC ............ *C08L 51/06* (2013.01); *C08K 5/0025* (2013.01); *C08K 5/54* (2013.01); *C08L 23/06* (2013.01); *C08L 23/12* (2013.01); *C08L 43/04* (2013.01); *C08F 230/08* (2013.01); *C08L 2205/02* (2013.01); *C08L 2207/02* (2013.01); *C08L 2207/062* (2013.01); *C08L 2312/00* (2013.01)

(58) Field of Classification Search
CPC ........ C08L 43/04; C08L 23/26; C08F 299/00; C08F 230/08
See application file for complete search history.

(56) References Cited

U.S. PATENT DOCUMENTS

| | | |
|---|---|---|
| 3,646,155 A | 2/1972 | Scott |
| 4,117,195 A | 9/1978 | Swarbrick et al. |
| 4,413,066 A | 11/1983 | Isaka et al. |
| 4,456,704 A | 6/1984 | Fukumura et al. |
| 5,552,448 A * | 9/1996 | Kobayashi ............. C08J 9/0061 521/154 |
| 5,735,830 A * | 4/1998 | Fritz ..................... A61L 29/041 604/523 |
| 5,756,582 A * | 5/1998 | Mori ........................ C08J 3/226 525/193 |
| 2006/0241405 A1 | 10/2006 | Leitner et al. |
| 2011/0112250 A1* | 5/2011 | Esseghir ................. C08L 23/04 525/193 |
| 2017/0011817 A1* | 1/2017 | Uematsu .................. C08K 3/04 |

FOREIGN PATENT DOCUMENTS

| | | |
|---|---|---|
| EP | 1354901 A1 | 10/2003 |
| EP | 1834987 A1 | 9/2007 |
| EP | 2319885 A1 | 5/2011 |
| EP | 3339366 A1 | 6/2018 |
| JP | H09157401 A | 6/1997 |
| JP | 2009529594 A | 8/2009 |
| JP | 2013515827 A | 5/2013 |
| JP | 2015532330 A | 11/2015 |
| RU | 2004131679 A | 5/2005 |
| WO | 2000/055225 A1 | 9/2000 |
| WO | 2009/056409 A1 | 5/2009 |
| WO | 2012/036846 A1 | 3/2012 |
| WO | 2013/182239 A1 | 12/2013 |
| WO | 2015/030055 A1 | 3/2015 |
| WO | 2015/077061 A1 | 5/2015 |

(Continued)

OTHER PUBLICATIONS

Kakugo et al., "13C NMR Determination of Monomer Sequence Distribution in Ethylene-Propylene Copolymers Prepared with d-TiCl3-Al(C2H5)2Cl" Macromolecules 1982, 15, pgs. 1150-1152.
Office action for Russian Patent Application No. 2019120977/04, dated Dec. 30, 2019.
Search Report for Russian Patent Application No. 2019120977/04, dated Dec. 30, 2019.
Office action for Canadian Patent Application No. 3,046,152, dated Dec. 5, 2019.

(Continued)

*Primary Examiner* — Marc S Zimmer
(74) *Attorney, Agent, or Firm* — Tarolli, Sundheim, Covell & Tummino LLP

(57) ABSTRACT

The present invention relates to crosslinkable polyolefin compositions, to a process for their preparation, to crosslinked compositions such as foams, sealants or adhesives and shaped articles, and their use in food packaging, textile packaging and technical and protection films. The crosslinkable polyolefin composition comprises one or more polyolefin polymers A, a hydrolysable silane functional polyolefin polymer B prepared from monomers comprising olefin monomers a) and silane functional compound(s) b), wherein the silane functional polyolefin polymer B is grafted onto the one or more polyolefin polymers A. The crosslinkable polyolefin compositions is crosslinkable by moisture.

15 Claims, 2 Drawing Sheets

(56) References Cited

FOREIGN PATENT DOCUMENTS

| WO | 2015/117948 A1 | 8/2015 |
|----|----------------|--------|
| WO | 2018/114633 A1 | 6/2018 |

OTHER PUBLICATIONS

Office action for Japanese Patent Application No. 2019-525999, dated Nov. 26, 2019.
Office action for India Patent Application No. 201917026307, dated Apr. 27, 2020.

\* cited by examiner

CROSSLINKABLE POLYOLEFIN COMPOSITION

The present invention relates to crosslinkable polyolefin compositions, to a process for their preparation, to crosslinked compositions and articles, such as foams, sealants or adhesives, and their use in food packaging, textile packaging and technical and protection films. More specifically, the present invention relates to crosslinkable polyolefin compositions comprising a silane functional polymer which is crosslinkable by moisture.

Currently available compositions for soft, flexible and strong products are for example flexible polyurethanes for which the mechanical properties are easily tuned in view of the envisaged application properties with proper choosing of type and amounts of the rigid/soft segments. However, flexible polyurethanes raise Health, Safety and Environment (HSE) concerns concerning residuals of some monomers. Especially the isocyanates used as monomers in the production of polyurethane are irritant to the mucous membranes of the eyes and gastrointestinal and respiratory tracts. Respiratory and dermal exposures to isocyanates may lead to sensitization. Therefore, the removal of isocyanates from foamed products is an important goal in that technical field.

Polypropylene does not have any HSE concerns. It is inert to the human body and is used in different application areas, including food packaging and medical devices. Polypropylenes feature chemical and thermal resistance as well as mechanical strength and are therefore used in different applications such as for moulding, in films, wires and cables or pipes. Furthermore, polypropylenes can be blown into foams. A disadvantage of the polypropylene materials is that they do not have sufficient mechanical properties. It is known that crosslinking of polypropylenes, for example of vinylsilane grafted polypropylenes, can improve the chemical and thermal resistance and increases the mechanical strength, but that grafting also i.a. reduces the melt strength and crosslinking also increases the stiffness.

WO2012036846 describes a process for forming a crosslinkable silane-grafted polypropylene composition comprising contacting a polyolefin, a multifunctional monomer and a silane compound (in particular vinyl trim-)ethoxy silane) in the presence of a radical initiator (e.g. a peroxide), wherein the polyolefin is selected from polypropylene, polyethylene, combinations thereof and copolymers thereof and the multifunctional monomer typically is a di- or tri-acrylic monomer. A disadvantage of the prior art method is that the control of the grafting reaction is difficult and the grafting reaction results in unacceptable degradation of the polymer (visbreaking) and deterioration of the properties, in particular melt flow rate (hereinafter referred to as "MFR") as shown by comparative examples herein.

WO2000055225 A1 describes a process for producing a polypropylene product cross-linked by silane where a polymer (such as polyethylene or polypropylene), a grafting agent (such as vinyltrimethoxysilane), an initiator (such as dicumyl peroxide) and a cross-linking catalyst (e.g. dibutyltin dilaurate) and possible additives are fed into an extruder and extruded, whereafter the grafted material obtained is cross-linked using water and the catalyst for obtaining a cross-linked polymer product and wherein the degree of the grafted material is determined using an on line method, for example by a thermomechanical analyser, and based upon the result obtained, the amounts of the components to be fed into the extruder are continuously adjusting in order to obtain the desired grafting degree. A disadvantage of the prior art method is that the method to control the grafting is unpractical and laborious and the grafting reaction still results in unacceptable degradation of the polymer and deterioration of the properties, in particular the melt flow rate.

WO2009056409 describes silane-functionalised polyolefin compositions which can crosslink to silane-crosslinked polyolefin compositions for use in wires and cables. The polyolefin composition comprises a polymer component (i) which is a polymer (A) bearing silane moieties, preferably a ethylene homopolymer or copolymer which bears silane-moieties and a polyolefin component (ii) which is a polymer of olefin having at least 3 carbon atoms which composition is crosslinkable to specified gelcontent or hot set elongation levels. The polyolefin component (ii) can be home- or copolymer polypropylene or specified heterophasic copolymers of PP. Said silane-crosslinkable polymer component (i) is a silane-grafted polymer component (i) obtainable by grafting hydrolysable silane compounds via radical reaction to said base polymer (A). Polyolefin component (ii) can be present during the silane grafting step or are added afterwards to the obtained silane-grafted polymer component (i). A disadvantage of this crosslinkable materials is that the silane-grafted polymer component (i) and polyolefin component (ii) are not miscible and a significant amount of the material is not crosslinked inducing phase separation.

Soft and flexible polypropylene materials are for example heterophasic propylene polymer compositions. In general such compositions have a matrix phase (A) and a rubber phase (B) dispersed within the matrix phase. EP1354901 describes such a heterophasic propylene polymer composition comprising a matrix phase comprising a propylene homopolymer and/or a propylene copolymer with up to 20 wt % of ethylene and a disperse phase comprising an ethylene rubber copolymer with from 20 to 70 wt % of ethylene, the ethylene rubber copolymer being distributed within the polymer composition in the form of particles. Also EP2319885 describes heterophasic propylene polymer compositions comprising a propylene random copolymer matrix phase (A), and an ethylenepropylene copolymer rubber phase (B) dispersed within the matrix phase having a good melt strength and low modulus and low cold xylene soluble fraction XCS. However, the heterophasic propylene polymer composition of the prior art have the disadvantage that the mechanical properties, in particular strength are insufficient for certain applications where typically flexible polyurethanes are used.

EP1834987 describes a heterophasic polypropylene composition comprising a propylene homo- or copolymer (A) as matrix phase and a crosslinked polyolefin (B) dispersed phase made by blending into matrix phase A a polyolefin B comprising hydrolysable silane-groups together with a silanol condensation catalyst and granulating into a water bath to cross-link polyolefin (B) to a degree of at least 30% based on the total polyolefin (B). The crosslinked polyolefin (B) is preferably a polyethylene vinylsilane copolymer like Visico LE4481.

U.S. Pat. No. 4,413,066 describes that hydrolysable silane-groups can be introduced into polyethylene by grafting the silane compound onto the polyolefin or by copolymerisation of the olefin monomers and silane-group containing monomers.

U.S. Pat. No. 4,456,704 describes a method for producing cross-linked polyethylene resin foams which comprises mixing a polyolefin resin, a blowing agent and, optionally, a surface active agent containing hydroxyl groups or an acid amide compound under pressure, said polyolefin resin containing a cross-linkable ethylene polymer having on the side chains thereof silyl groups which effect cross-linking upon contact with water; extruding the mixture into a low pressure zone where the extrudate is allowed to expand; and bringing the expanded extrudate into contact with a silanol condensing catalyst so that the expanded extrudate is cross-linked on contact with water. The cross-linkable ethylene polymer is a random copolymer of ethylene and an unsaturated silane compound or a graft copolymer of an ethylene polymer and an unsaturated silane compound.

U.S. Pat. No. 3,646,155 describes it is known to modify the properties of polyethylene and other olefinic polymers by effecting cross-linking of the polymers under the action of a free radical generator, for example an organic peroxide, but instead proposes an improved method for effecting the cross-linking of a polyolefin resides in a process involving the reaction of a silane with the polyolefin under specified conditions and the subsequent reaction of the modified polyolefin with a silanol condensation catalyst and water. The silane functional polyolefin is prepared by reacting a polyolefin, which is polyethylene or a copolymer of ethylene with a minor proportion of propylene and/or butylene, with an unsaturated silane in presence of a radical initiator at a temperature above 140° C.

U.S. Pat. No. 4,117,195 describes a process for the direct manufacture of extruded crosslinked products wherein the polymer, a hydrolysable unsaturated silane, a free-radical generator and a silanol condensation catalyst (preferably polyethylene, vinyl trimethoxy silane, a peroxide, and dibutyltin dilaurate) are blended and heated until silane groups have been grafted to said polymer and extruding said mixture directly out of said extruder through an extrusion die to form an elongate product of a required final shape and subjecting said elongate product to the action of moisture until said polymer therein is cross-linked.

BRIEF DESCRIPTION OF THE INVENTION

In view of the above developments, there is still a desire to provide materials that do not have one or more of the mentioned disadvantages, in particular soft, flexible materials that have desirable mechanical and chemical properties, such as a low gel content, increased melt strength and easily tunable softness, but that have no HSE concerns.

According to the invention one or more of the above mentioned problems have been solved by providing a cross-linkable polyolefin composition comprising one or more polyolefin polymers A, a hydrolysable silane functional polyolefin polymer B prepared from monomers comprising olefin monomers a) and silane functional compounds) b), wherein the silane functional polyolefin polymer B is grafted onto the one or more polyolefin polymers A. The crosslinkable polyolefin composition is prepared typically by melt mixing the one or more polyolefin polymers A and the hydrolysable silane functional polyolefin polymer B, adding a radical initiator component C, optionally adding a polyunsaturated component D and optionally adding a silane condensation catalyst E, wherein polymer B is grafted on the one or more polyolefin polymers A. In a preferred embodiment of the invention the one or more polyolefin polymers A in the crosslinkable polyolefin composition is a heterophasic polypropylene composition.

In another aspect, the invention relates to a process for the preparation of a crosslinkable polyolefin composition comprising melt mixing the one or more polyolefin polymers A and the hydrolysable silane functional polyolefin polymer B. In this process a radical initiator component C is added which initiates the grafting reaction of polymer B onto the one or more polyolefin polymers A. Optionally, in this process a polyunsaturated component D and a silane condensation catalyst E can be added. This process is typically carried out in an extruder, preferably a twin-screw extruder and at a temperature between 180 and 230° C.

In yet another aspect, the invention relates to a process for crosslinking the crosslinkable composition, specifically the crosslinking of the silane groups of polymer B that is grafted onto the one or more polyolefin polymers A. Crosslinking is assisted by a silane condensation catalyst E which is selected from the group of Lewis acids, inorganic acids, organic acids, organic bases, organometallic compounds and complexes. In the case of organometallic compounds and complexes, also precursors of such compounds can serve as a silane condensation catalyst E.

Further the invention relates to crosslinked products obtainable by the above processes. According to the invention, the obtained crosslinked products can be foams, sealants, adhesives, or expanded foam layers. The crosslinkable polyolefin composition can be also first shaped into an article and subsequently exposed to moisture to induce crosslinking.

BRIEF DESCRIPTION OF THE FIGURES

The following abbreviations are used in the figure explanations: random heterophasic copolymer (hereinafter referred to as "RAHECO"), a vinylsilane copolymer (hereinafter referred to as "VISICO"), a polybutadiene (hereinafter referred to as "PB") masterbatch.

DETAILED DESCRIPTION OF THE INVENTION

Figure 1:
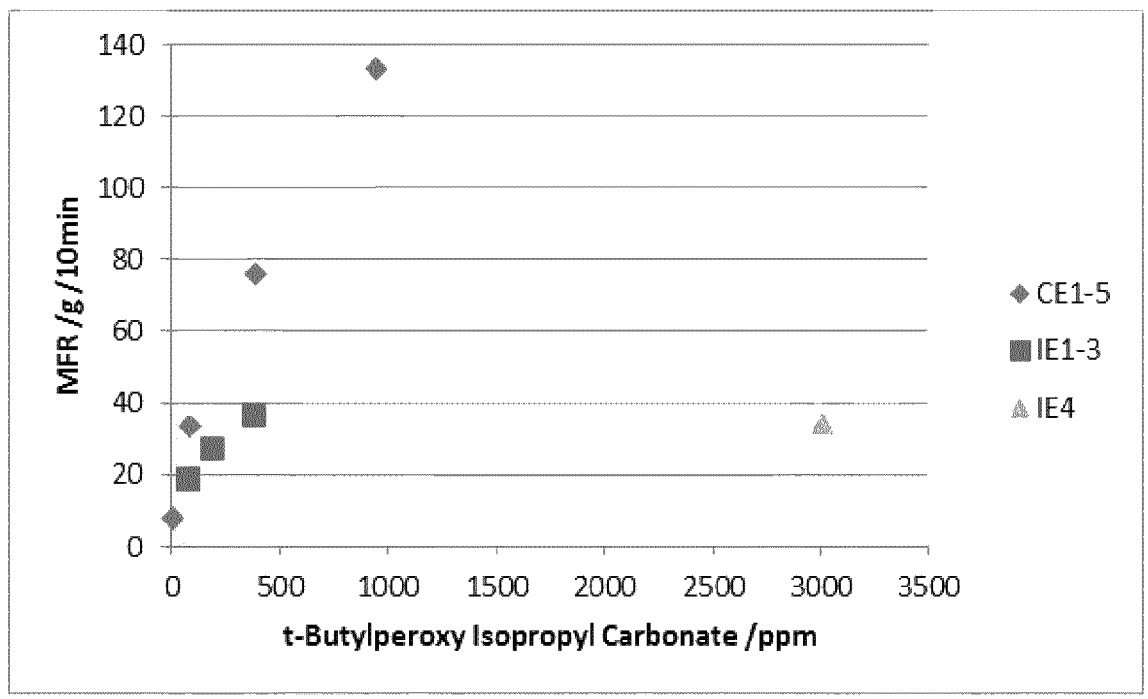
FIG. 1 shows the effect of the peroxide concentration on the melt-flow rate in peroxide-induced (grafting) reactions of RAHECO.

The crosslinkable polyolefin composition comprises one or more polyolefin polymers A and a hydrolysable silane functional polyolefin polymer B wherein the silane functional polyolefin polymer B is grafted onto the one or more polyolefin polymers A. Polymer B is prepared from monomers comprising olefin monomers a) and silane functional compounds) b). The silane functional compounds) b) can be monomers that are copolymerised with olefin monomers a) and optional other monomers to polymer B. Alternatively, the silane functional compounds) b) are reacted after polymerisation of olefin monomers a) and optional other monomers to form a hydrolysable silane functional polyolefin polymer B. Both types of silane functional compounds) b) provide a silane functional polyolefin polymer B which is grafted onto the one or more polyolefin polymers A. The fact that the silane functional component is a hydrolysable silane functional polyolefin polymer B allows for compatibility with the polymers A and further for protection of the polymer A in the grafting reaction in that the MFR of the polymer A is not increased to an unacceptable level.

The silane functional compounds) can be selected from the group of silane halides, e.g. trichloro(methoxy)silane, or alkoxysilanes, e.g. triethoxysilane ($HSi(OC_2H_5)_3$) which can be introduced into a polymer or polymer precursor via addition or condensation reactions.

In a preferred embodiment of the invention, the silane functional compounds) b) are represented by the formula (I)

$$R^1SiR^2_qY_{3-q} \quad (I)$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y which may be the same or different is a hydrolysable organic group and q is 0, 1 or 2. In a more preferred embodiment, silane functional compounds) b) are unsaturated silane compounds of formula II

$$R^1Si(OA)_3 \quad (II)$$

wherein each A is independently a hydrocarbyl group having 1-8 carbon atoms, but preferably 1-4 carbon atoms. In this embodiment hydrolysable group Y in formula I is an alkoxy group with 1-8 C atoms. The $R^1$ moiety is preferably selected from the group of vinyl, allyl, isopropenyl, butenyl, cyclohexenyl or gamma-(meth)acryloxy propyl, most preferably vinyl; Y can preferably be selected from the group of methoxy, ethoxy, formyloxy, acetoxy, propionyloxy or an alkyl- or arylamino group; the $R^2$ moiety, if present, is a methyl, ethyl, propyl, decyl or phenyl group. Suitable silane functional compounds) b) are chosen from the group comprising gamma-(meth)acryl-oxypropyl trimethoxysilane, gamma-(meth)-acryl-oxypropyl triethoxysilane, and vinyl triacetoxysilane or combinations of two or more thereof and preferably, vinyl bismethoxyethoxysilane, more preferably vinyl trimethoxysilane or vinyl triethoxysilane.

In a preferred embodiment, the olefin monomers a) in polymer B comprise predominantly, i.e. preferably at least 50, 70, 90 or even at least 95 wt %, ethylene or propylene or both ethylene and propylene and further optional minor amounts of (vi) alpha-olefins, such as 1-butene, 1-hexene, 1-octene and 4-methyl-1-pentene, and (vi) aromatic vinyl compounds, such as styrene and alpha-ethyl styrene. In a preferred embodiment, polymer B is a silane functional ethylene homo- or copolymer, a high density polyethylene, low density polyethylene, or linear low density polyethylene. Polymer B preferably comprises one or more polar comonomer(s) c). Comonomers c) are introduced to increase polarity of the polymer B so that the adhesion properties of the composition can be improved. Preferably the one or more polar comonomer(s) c) are selected from the group of (i) vinyl carboxylate esters, such as vinyl acetate and vinyl pivalate, (ii) (meth)acrylates, such as methyl(meth)acrylate, ethyl(meth)acrylate and butyl(meth)acrylate, (iii) olefinically unsaturated carboxylic acids, such as (meth)acrylic acid, maleic acid and fumaric acid, (iv) (meth)acrylic acid derivatives, such as (meth)acrylonitrile and (meth)acrylic amide, (v) vinyl ethers, such as vinyl methyl ether and vinyl phenyl ether. The one or more polar comonomer(s) c) are preferably selected from alkyl acrylates, or alkyl esters of (alkyl-)acrylates, wherein the alkyl groups have 1-6 C atoms, but more preferably selected from butyl-, ethyl- or methyl esters of (meth-)acrylates.

In a most preferred embodiment of polymer B, the amount (wt %) of the silane functional compound b) relative to the total weight of polymer B is from 0.1 to 10, preferably from 0.3 to 8, preferably from 0.5 to 7.0, preferably from 1.0 to 5.0, more preferably from 1.2 to 4.0, even more preferably from 1.5 to 4.0, but most preferably from 1.5 to 2.5 wt %. The amount of polar comonomer(s) c) in polymer B is preferably chosen from 2.5 to 18 mol %, preferably from 2.5 to 15.0 mol %, more preferably from 4.5 to 12.5 mol %, most preferably from 5.4 to 12.5 mol % wherein mol % is relative to the total amount (mol) of monomers a) and c) and compounds) b).

Polymer B is either a copolymer obtained by polymerising monomers a), b) and optionally comonomer c), or is obtained by reacting a polymer comprising monomer a) and optionally comonomer c) with silane functional compounds) b). Most preferably polymer B is a terpolymer made in a high pressure reactor made from monomers comprising polar monomers like acrylates, most preferably butyl acrylate, ethylene and vinyl trimethoxysilane.

Polymer B preferably has a density between 860 and 970 kg/m$^3$, more preferably between 920 and 960 kg/m$^3$, even more preferably between 930 and 960 kg/m$^3$, but most preferably between 940 and 955 kg/m$^3$, measured according to ISO 1872-2, a melt flow rate of 0.1 to 500, preferably of 0.1 to 150, more preferably of 0.5 to 50, most preferably of 0.5 to 20 g/10 min (measured according to ISO 1133 at 190° C. and at a load of 2.16 kg) and a melting temperature (Tm) of 110° C. or less, preferably between 70 and 110° C., more preferably between 80 and 110° C., most preferably between 84 and 100° C.

The polymer B is preferably prepared by polymerising monomers a), b) and optionally comonomer c), for example by radical polymerisation as is known in the art. In a preferred embodiment the polymer (a) is produced by polymerising ethylene with one or more polar comonomer (s) and with silane group(s) containing comonomer, i.e. silane group(s) containing units (b), as defined above in a high pressure (HP) process using free radical polymerization in the presence of one or more initiator(s) and optionally using a chain transfer agent (CTA) to control the MFR of the polymer. The HP reactor can be e.g. a well-known tubular or an autoclave reactor, suitably a tubular reactor. The high pressure polymerisation and the adjustment of process conditions for further tailoring the other properties of the polymer depending on the desired end application are well known and described in the literature, and can readily be used by a skilled person. Suitable polymerisation temperatures range up to 400° C., suitably from 80 to 350° C. and pressures from 70 MPa, suitably 100 to 400 MPa, suitably from 100 to 350 MPa. In an alternative process polymer B can be prepared by providing a polymer comprising monomer a) and optionally comonomer c) and reacting that polymer with a silane functional compound b). This process can be a grafting process wherein silane monomers b), as described herein, are grafted onto a polyolefin polymer, for example in the presence of a radical forming compound.

In a preferred embodiment the crosslinkable polyolefin composition comprises a polymer B comprising alkene monomers a), wherein the alkene has 2-8 carbon atoms, wherein the alkene preferably is ethylene, propylene, or a mixture thereof, a vinyl trialkoxysilane monomer b), wherein the alkoxy groups have 1 to 8 carbon atoms, more preferably 4 carbon atoms, most preferably either two or one carbon atoms, an alkyl (alkyl-)acrylate monomer c), wherein the alkyl (alkyl-)acrylate is methyl- or ethyl (meth-)acrylate. More preferably, polymer B is a random copolymer comprising between 77 and 97 mol % of alkene monomers a), between 0.4 and 5 mol % vinyl trimethoxysilane monomers b), between 2.5 and 18 mol % alkyl acrylate monomers c), wherein monomers a), b) and c) constitute at least 80, 90, 95 and most preferably 100 mol % of the random copolymer. It is desirable for the invention that in the crosslinkable polyolefin composition, the constituents of polymer B are chosen such that polymer B is compatible with at least one of the one or more polymers A. Good compatibility is preferred in view of an efficient and homogeneous grafting of polymer B onto polymers A.

According to the invention, the one or more polyolefin polymers (A) can be polyethylene homopolymer or polypropylene homo- or copolymer, preferably propylene homo- or copolymer or blends thereof, preferably heterophasic compositions, more preferably random heterophasic propylene copolymer (raheco) compositions. However, in a preferred embodiment the one or more polyolefin polymers A comprise two or more polyolefin polymers forming a heterophasic composition, preferably a random heterophasic propylene copolymer composition (raheco). The raheco composition is based on ethylenepropylene copolymers, in which the ethylene and propylene content varies, resulting in phase separation in polymers A.

The Raheco propylene copolymer compositions form a family of interesting materials for use in the present invention (as component A) combining the benefits of random copolymer (optics) and heterophasic copolymer (mechanical properties). The properties depend on the comonomer content, type of comonomer as well as on the rubber design. The properties such as softness and transparency can be tailored in a very broad range. Therefore this type of materials are found in a wide range of applications such as films, moulding, modifiers and hot melt adhesives. The heterophasic propylene polymer compositions of the prior art have the disadvantage that the mechanical properties, in particular strength are insufficient for certain applications where typically flexible polyurethanes are used. The limited spectrum of mechanical properties, in particular a low strength, limits the use of soft PP into commodity applications where other non-PP materials with HSE concerns are required. There is a need to broaden the range of mechanical properties and broaden the application areas of RAHECO PP for specialty applications. However, propylene copolymers and also Raheco's are particularly sensitive to degradation in particular in combination with peroxides, which limits the possibilities for modification by grafting. However, a particular advantage of the process of the present invention is that the modification with crosslinking functionality can be done without too much degradation and MFR increase thus making available a new range of materials which are both soft and strong.

Suitable heterophasic propylene polymer compositions that can be used, as the one or more polyolefin polymers A, in the invention are described in EP1354901. The composition comprises 70 to 95 wt % of a matrix phase comprising a propylene homopolymer and/or a propylene copolymer with at least 80 wt % of propylene and up to 20 wt % of ethylene and/or a C4-C10 a-olefin, and 5 to 30 wt % of a disperse phase comprising an ethylene rubber copolymer with from 20 to 70 wt % of ethylene and 80 to 30 wt % of propylene and/or a C4-C10 a-olefin, the ethylene rubber copolymer being distributed within the polymer composition in the form of particles, which propylene polymer composition has an MFR of >100 g/10 min (230° C./2.16 kg).

EP2319885 describes heterophasic propylene polymer compositions comprising a propylene random copolymer matrix phase (A), and an ethylenepropylene copolymer rubber phase (B) dispersed within the matrix phase having a good melt strength and low modulus and low cold xylene soluble fraction XCS. The heterophasic polypropylene resin has a MFR (2.16 kg, 230° C.) of at least 1.0 g/10 min, determined according to ISO 1133, comprising a propylene random copolymer matrix phase (A), and an ethylenepropylene copolymer rubber phase (B) dispersed within the matrix phase, wherein the heterophasic polypropylene resin has a fraction soluble in p-xylene at 25° C. (XCS fraction) being present in the resin in an amount of 15 to 45 wt % whereby the XCS fraction has an ethylene content of 25 wt % or lower, and a fraction insoluble in p-xylene at 25° C. (XCU fraction), said heterophasic polypropylene resin being characterised by a strain hardening factor (SHF) of 1.7 to 4.0 when measured at a strain rate of 3.0 s·1 and a Hencky strain of 3.0.

Variations on the heterophasic copolymer compostions are described in WO2015117958 describing a composition for injection moulding with improved balance between optical and mechanical properties such as toughness (impact strength) and haze and in WO2015117948 describing a special soft and transparent composition for film with improved balance between softness, impact strength and optical properties such as haze.

The features of the heterophasic propylene polymer composition described in the above mentioned prior art are herewith enclosed by reference.

A particularly preferred raheco is a polypropylene composition comprising:
a) 55.0 to 90.0 wt % of a crystalline propylene random copolymer (C-PP) comprising propylene monomers and 1.0 to 6.5 wt % of at least one comonomer selected from ethylene and a $C_4$-$C_{12}$ alpha-olefin, having a melting temperature in the range of 135 to 155° C. as measured according to ISO 11357-3 and a melt flow rate ($MFR_2$) in the range of 0.1 to 15 g/10 min as measured according to ISO 1133 at a temperature of 230° C. and under a load of 2.16 kg and preferably having a glass transition temperature Tg(a) in the range of −10.0 to 1.0° C.
b) 10.0 to 45.0 wt % of an amorphous propylene copolymer (AM-PP) comprising propylene monomers and 30.0 to 50.0 wt % of at least one comonomer selected from ethylene and a $C_4$-$C_{12}$ alpha-olefin and having a glass transition temperature Tg(b) in the range of −60 to −40° C., the wt % of the C-PP and AM-PP copolymers being relative to the total weight of the C-PP and AM-PP copolymers, said polypropylene composition having a melt flow rate ($MFR_2$) in the range of 0.3 to 90 g/10 min as measured according to ISO 1133 at a temperature of 230° C. and under a load of 2.16 kg and preferably also having a relative content of isolated to block comonomer sequences I(E) in the range of 20 to 50%, which is calculated according to the equation:

$$I(E)=fPEP/((fEEE+fPEE+fPEP))\times 100 \quad (1)$$ wherein

I(E) is the relative content of isolated to block comonomer sequences [in %];
fPEP is the mol fraction of propylene/comonomer/propylene sequences (PEP) in the sample;
fPEE is the mol fraction of propylene/comonomer/comonomer sequences (PEE) and of comonomer/comonomer/propylene sequences (EEP) in the sample;
fEEE is the mol fraction of comonomer/comonomer/comonomer sequences (EEE) in the sample The sequence concentrations are based on a statistical triad analysis of 13C-NMR data determined using the analysis method of Kakugo et al. (Kakugo, M., Naito, Y., Mizunuma, K., Miyatake, T. Macromolecules 15 (1982) 1150).

The raheco composition preferably have a total comonomer content in the range of 7.0 to 25.0 wt % and preferably a xylene cold soluble (XCS) content, determined according ISO 16152 at 25° C., in the range of 15.0 to 50.0 wt %, preferably 15.0 to 40 or 19 to 35 wt %, wherein the XCS fraction preferably has a comonomer-, preferably ethylene-, content between 25 and 50, preferably between 30 and 45 wt %, the XCS fraction further preferably has a intrinsic viscosity between 1.2 and 4, preferably between 1.5 and 3.5 dl/g, and wherein the XCS fraction further preferably has a I(E) between 15 and 45, preferably between 17 and 40 or even between 19 and 35%.

The crosslinkable polyolefin composition comprises the one or more polyolefin polymers A and the hydrolysable silane functional polyolefin polymer B. The amount of polymer B is from 10 to 80 wt %, preferably from 20 to 70, more preferably from 20 to 60, but most preferably from 25 to 50 wt % relative to the total weight of polymers A and B. If the one or more polymers A are a heterophasic polypropylene composition, then the amount of polymer B is chosen from 5 to 55 wt %, more preferably from 10 to 50 wt % and most preferably from 15 to 45 wt %, based on the total weight of polymers A and B.

One of the advantages of the invention is that the crosslinkable polyolefin composition can have a low crosslinked fraction, in particular a decaline sol gel content of less than 3.0 wt %, but preferably less than 2.5, 2.0 or even 1.5 wt %. Thus, the provided crosslinkable polyolefin composition does not have a large insoluble fraction which provides many benefits for subsequent processing and use of the composition.

In another embodiment of the invention the crosslinkable polyolefin composition can further comprise a silane condensation catalyst E for crosslinking the crosslinkable composition. Crosslinking is governed by the hydrolysis of the silane groups of polymer B that has been grafted onto A. This crosslinking reaction is assisted by the silane condensation catalyst E which can be selected from the group of Lewis acids, inorganic acids, organic acids, organic bases and organometallic compounds. Organic acids can be selected from, but are not limited to, citric acid, sulphonic acid and alkanoic acids. Organometallic compounds can be selected from, but are not limited to, organic titanates and metal complexes of carboxylates, wherein the metal can be selected from, lead, cobalt, iron, nickel, zinc and tin. In the case of organometallic compounds, typically organometallic complexes and precursors thereof can be included as a silane condensation catalyst E. The tin based and sulphonic based catalysts allow for ambient curing typically curing at 23° C. The sulphonic based catalyst are preferred from HSE point of view compared to tin based catalysts. If added to the crosslinkable polyolefin composition the silanol condensation catalyst is present in an amount of 0.0001 to 6 wt %, more preferably of 0.001 to 2 wt %, and most preferably of 0.05 to 1 wt %.

Furthermore, the invention relates to a process for the preparation of a crosslinkable polyolefin composition comprising melt mixing the one or more polyolefin polymers A and the hydrolysable silane functional polymer B, adding a radical initiator component C, optionally adding a polyunsaturated component D and optionally adding a silane condensation catalyst E, wherein polymer B is grafted on the one or more polyolefin polymers A. Preferably the melt mixing is done in an extruder. In this process a radical initiator component C is added to initiate the grafting reaction of polymer B onto the one or more polyolefin polymers A. Component C is typically a peroxy radical initiator, preferably tert-butylperoxy isopropyl carbonate, and preferably present at a concentration of at least 50 ppm, typically between 50 and 1000 ppm relative to the total amount of polymers A and B. Optionally, in this process a polyunsaturated component D can be added to facilitate the grafting reaction. The polyunsaturated component D is preferably a butadiene or a polybutadiene oligomer, wherein the polyunsaturated component D is present in an amount between 0.1 and 10 wt %, preferably between 0.1 and 5 wt %, more preferably between 0.2 and 2 wt % relative to the total weight of polymers A and B and components C and D. The presence of component D can have beneficial effects on the mechanical properties of the crosslinkable composition. The optional addition of the silane condensation catalyst E provides control over the crosslinking in the final product when subject to moisture. Polyolefin polymer A and silane functional polymer B are typically blended together with a silanol condensation catalyst E. During the melt mixing of these components in an extruder it is preferred that polymer B is blended with and grafted onto polymer A first and that the resulting blend is then blended with catalyst E fed into the extruder at one of the subsequent extruder segments.

The crosslinkable polyolefin composition may further contain various additives, such as miscible thermoplastics, further stabilizers, lubricants, fillers, colouring agents and foaming agents, which can be added to the composition before during or after the first blending step.

The process for the preparation of a crosslinkable polyolefin composition is typically carried out in an extruder, preferably at a temperature between 180 and 230° C., more preferably between 185 and 225° C. Preferably a twin-screw extruder is used with at least two high intensity mixing segments, wherein the temperature of the two high intensity mixing segments is between 180 and 230° C., but more preferably between 185 and 225° C.

Known processes for the preparation of crosslinkable polyolefin compositions, in particular for crosslinkable polypropylene compositions, which are based on grafting hydrolysable silane functional compounds onto polyolefins, suffer from polymer degradation resulting in viscosity reduction of the polyolefin, also referred to as visbreaking. Because the grafting reaction relies on a radical initiator component, polymers often degrade during the reaction resulting in breaking of the polymer chains, which manifests itself in an increased melt flow rate. This limits the amount of crosslinkable functionality that can be achieved on the polymer component A and limits the range of mechanical properties achievable in the crosslinked composition. According to the invention, the problem of visbreaking has been significantly reduced. In the process for the preparation of a crosslinkable polyolefin composition, a good degree of crosslinking functionality can be achieved with limited and acceptable MFR increase of the grafted crosslinkable composition. Typically the MFR increase of the grafted crosslinkable composition is less than a factor 10, preferably less than 8, more preferably less than 5 or most preferably less than 3 compared to the mixture of polymers A and B) before the grafting reaction.

In the absence of polymer B the MFR would increase significantly as a result of the grafting reaction. The invention therefore provides a process for the preparation of a crosslinkable polyolefin composition, wherein the grafting reaction results in a MFR less than 80%, preferably less than 70%, more preferably less than 60% or most preferably less than 55% compared to a reaction product of polymer A, obtained in the absence of polymer B, but otherwise at the same amount of components C and D and at the same reaction conditions. Despite effective grafting the grafting reaction results in a decaline sol gel content of less than 3 wt %, preferably less than 2.5, more preferably less than 2 wt % or most preferably less than 1.5 wt %.

The invention also relates to a process for the manufacture of crosslinked products comprising i) providing a crosslinkable polyolefin composition according to the invention, ii) optionally shaping the crosslinkable polyolefin composition into a shaped article and iii) exposing the crosslinkable polyolefin composition to moisture preferably at a temperature higher than 20° C. Several parameters will influence the properties of the crosslinked products. Moisture can be provided by either ambient air conditions or in a water bath. If present, the silane condensation catalyst E catalyses the condensation reaction of the hydrolysable silane groups on polymer B. Because polymer B is grafted onto the one or more polymers A the condensation of the silane functional groups provide a crosslinked composition.

The invention further relates to crosslinked products obtainable by this process. The crosslinked product can be a foam, a sealant, an adhesive or a shaped article, more preferably a crosslinked expanded foam layer. The crosslinked product according to the invention is very suitable for use in food packaging, textile packaging, technical films, protection films or medical devices.

Definitions and Measurement Methods a. Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR also provides a measure to assess visbreaking of a polymer during production processes, for example during grafting reactions. The MFR2 of polypropylene is determined at a temperature of 230° C. and a load of 2.16 kg, the MFR5 of polyethylene is measured at a temperature of 190° C. and a load of 5 kg and the MFR2 of polyethylene at a temperature of 190° C. and a load of 2.16 kg.

b. Decaline Insoluble Fraction

The content of decaline hot insoluble components is determined by extracting 1 g of finely cut polymer sample with 500 ml decaline in a Soxleth extractor for 48 hours at the boiling temperature of the solvent. The remaining solid amount is dried at 90° C. and weighed to determine the amount of insoluble components. The crosslinking degree is determined as the mathematical fraction of the decaline hot insoluble fraction and the total content of the heterophasic polypropylene composition.

c. XCS Xylene Cold Soluble Fraction

The xylene cold soluble (XCS) fraction was measured according to ISO 16152 at 25° C. The part which remains insoluble is the xylene cold insoluble (XCI) fraction.

d. Storage Modules (G') and Glass Transition Temperature (Tg)

The storage modulus G' and the glass transition temperature Tg were measured by Dynamic Mechanical Thermal Analysis (hereinafter referred to as "DMTA") analysis. The DMTA evaluation and the storage modulus G' measurements were carried out in torsion mode on compression moulded samples at temperature between −130° C. and +150° C. using a heating rate of 2° C./min and a frequency of 1 Hz, according to ISO 6721-07. The measurements were carried out using an Anton Paar MCR 301 equipment. The compressed molded samples have the following dimensions: 40×10×1 mm and are prepared in accordance to ISO 1872-2:2007. The storage modulus G'23 was measured at 23° C.

e. Tensile Properties

Tensile properties were assayed according to two different methods. For data presented in Table 1, the elongation at break (EAB) was measured at 23° C. according to ISO 527-1:2012/ISO 527-2:2012 using an extensometer (Method B) on injection moulded specimens, type 1B, produced according to ISO 1873-2 with 4 mm sample thickness. The test speed was 50 mm/min, except for the tensile modulus (E) measurement which was carried out at a test speed of 1 mm/min. For data presented in Table 2, tensile properties were measured according to ISO 527-2/5A/250; the Crosshead (grips holding the specimen) movement speed was set to 250 mm/min. Test specimen were produced as described in EN ISO 1872-2, specimen type 5A according to ISO 527-2 were used. The plaque thickness used was 1.8 mm.

EXAMPLES

The following is a description of certain embodiments of the invention, given by way of example only.

Inventive Examples IE1 to IE4

The components and amounts used in the examples are indicated in Table 1. The Polymer A1, BPIC and Visico LE4481 were added in the specified amounts into a ZSK40 twin-screw extruder at a melt temperature of 185° C. using a screw speed of 120 rpm and an extruder throughput of 40 kg/h. The temperature profile was set as follows in subsequent mixing segments: 190-200-220-200-190-170-180° C. The resulting molten composition was pelletized after solidification of the strands in a water bath in a strand pelletizer at a water temperature of 40° C. In inventive example 1E4 additionally a PB masterbatch PA104 was added.

Comparative Examples CE1 to CE4

The components and amounts used in the comparative examples are indicated in Table 1 and products were prepared in the same way as specified in Example 1E1 above. In the comparative examples CE1 and CE2 products are prepared without radical initiator; resulting in no grafting and mere blending. In the comparative examples CE3-CE5 products were prepared without silane functional polymer B (VISICO), but with radical initiator present to compare the effect of MFR increases as a result of visbreaking of RAHECO.

TABLE 1

| Experimental results | | | | | | | | | | |
|---|---|---|---|---|---|---|---|---|---|---|
| | units | CE1 | CE2 | IE1 | IE2 | IE3 | IE4 | CE3 | CE4 | CE5 |
| Polymer A1 (a) | wt % | 65 | 85 | 84.8 | 84.5 | 84 | 76.5 | 99.8 | 99 | 97.5 |
| Visico LE4481 (b) | wt % | 35 | 15 | 15 | 15 | 15 | 15 | | | |
| PA104 (c) | wt % | | | | | | 0.5 | | | |
| BPIC (d) | wt % | 0 | 0 | 0.2 | 0.5 | 1 | 8 | 0.2 | 1 | 2.5 |

TABLE 1-continued

Experimental results

|  | units | CE1 | CE2 | IE1 | IE2 | IE3 | IE4 | CE3 | CE4 | CE5 |
|---|---|---|---|---|---|---|---|---|---|---|
| BPIC | ppm | 0 | 0 | 75 | 187.5 | 375 | 3000 | 75 | 375 | 937.5 |
| MFR | g/10 min | 10.6 | 7.6 | 18.64 | 27.1 | 36.6 | 34.36 | 33.7 | 76.1 | 133 |
| XCS | wt % | 23.6 | 21.64 | 22.55 | 22.1 | 19.01 | 10.8 |  |  |  |
| Decaline insoluble | wt % |  | 0 | 0 | 0.14 | 0.74 | 1.1 |  |  |  |
| Tg1 | ° C. | −40.7 | −44.1 | −42.3 | −40.7 | −39.8 | −42.7 |  |  |  |
| Tg2 | ° C. | 0.4 | 0.1 | −1 | −0.9 | −0.8 | −2.3 |  |  |  |
| G' | MPa | 222 | 309 | 292 | 284 | 273 | 181 |  |  |  |
| Tensile modulus | MPa | 364 | 523 | 490 | 479 | 457 | 382 |  |  |  |
| Elongation at break | % | 854 | 672 | 912 | 889 | 823 | 419 |  |  |  |

(a) Polymer A1 is a soft random heterophasic PE/EPR/PP copolymer (RAHECO) with melt flow rate (230° C./2.16 kg) of 7 g/10 min, a flexural modulus of 500 MPa, a melt temperature (DSC) of 140° C. and medium molecular weight distribution.
(b) VISICO ™ LE4481 is a low-density ethylene/vinyl silane/butyl acrylate terpolymer.
(c) PA104 is a polybutadiene masterbatch
(d) BPIC is tert-butylperoxy isopropyl carbonate Resulting compositions were analysed according to the methods described above to determine the melt flow rate MFR, the cold soluble fraction XCS, the decaline insoluble fraction and the mechanical properties. All samples are without added silane condensation catalyst and all data relate to grafted but uncrosslinked products. It can be seen that the melt-flow rate of 1E1-1E3 remains clearly below the melt-flow rate of CE3-CE5 at comparable BPIC concentration. This data shows that VISICO is not merely grafted onto RAHECO, but also prevents visbreaking of the RAHECO Polymer. 1E4 shows that a PB masterbatch reduces visbreaking even at high BPIC concentrations, even as high as 3000 ppm.

Table 2 shows comparative examples CE1.1 and CE2.1 and examples 1E1.1 to 1E3.1 relating to the same compositions as CE1, CE2 and 1E1 to 1E3 described in Table 1, also containing silane condensation catalyst which assists crosslinking of the silane groups on exposure to moisture. The silane condensation catalyst was added as a masterbatch (MB) in an amount of 5 wt % based on the total amount of components comprised in the respective composition in Table 2. The masterbatch contained 3.5 wt % of the silanol condensation catalyst dioctyl tin dilaurate (DOTL) as a crosslinking catalyst and as a carrier polymer an ethylene butylacrylate copolymer with 17 wt % of butylacrylate, a density of 924 kg/m³ and an MFR2 of 17 g/10 min.

The polymers were blended with the silane crosslinking agent E, which was the tin based condensation catalyst DOTL. The amount of the catalyst was $2.3 \times 10^{-3}$ mol catalyst/kg polymer composition. The blending was carried out in Brabender mixer at 125° C., with a kneading time of 20 min. The obtained mixture was grinded to pellets and the obtained grinded pellets were used for tape extrusion in a Collin E20T extruder. The temperature settings in three zones were adjusted to 160, 180 and 180° C. The die was adjusted to 1.7 mm. No water, thus only air cooling was used to avoid the precrosslinking of the tapes. The extruded film tapes with a thickness of 1.7±0.1 mm were die cut and the dumbbell specimens for tensile measurements were produced and measured as described above. The produced dumbbell specimens were used for crosslinking measurements on crosslinked samples or were used directly for measuring tensile property measurements from non-crosslinked samples. Crosslinking was carried out at 90° C. for 16 h in a water bath. Measurement of the tensile properties was done at 23° C. (Table 2). Clearly the Nominal Elongation at break of the samples according to the invention (1E1.1 to IE1.3) is much lower than that of the ungrafted samples (CE1.1 and CE2.1).

TABLE 2

Tensile properties at 23° C.: Uncrosslinked (UNXL, thermoplastic) versus crosslinked (XL) samples

|  | units | CE1.1 | CE2.1 | IE1.1 | IE2.1 | IE3.1 |
|---|---|---|---|---|---|---|
| Polymer A1 (a) | wt % | 65 | 85 | 84.8 | 84.5 | 84 |
| Visico LE4481 (b) | wt % | 35 | 15 | 15 | 15 | 15 |
| PA104 (c) | wt % |  |  |  |  |  |
| BPIC (d) | wt % | 0 | 0 | 0.2 | 0.5 | 1 |
| BPIC | ppm | 0 | 0 | 75 | 187.5 | 375 |
| +5 wt % of catalyst MB to the blend |  |  |  |  |  |  |
| Nominal Elongation at break, UNXL | % | 616 | 606 | 567 | 546 | 502 |
| Nominal Elongation at break, XL | % | 537 | 545 | 442 | 377 | 295 |

DETAILED DESCRIPTION OF THE FIGURES

FIG. 1 shows the effect of the peroxide concentration on the melt-flow rate in peroxide-induced (grafting) reactions of RAHECO, comparing pure RAHECO (diamonds: samples CE1-4), blends of RAHECO and VISICO (red squares: samples IE1-3) and of a blend of RAHECO and VISICO with addition of PB masterbatch (green triangle: samples IE4). Blends of RAHECO and VISICO (1E1-1E3) retain a low and favorable MFR during peroxide-induced grafting, whereas the MFR of pure RAHECO strongly increases at the same peroxide concentration. Through the addition of a small amount of PB masterbatch (1E4) a low and favorable MFR is maintained during peroxide-induced grafting even at very high BPIC concentrations.

Figure 2:
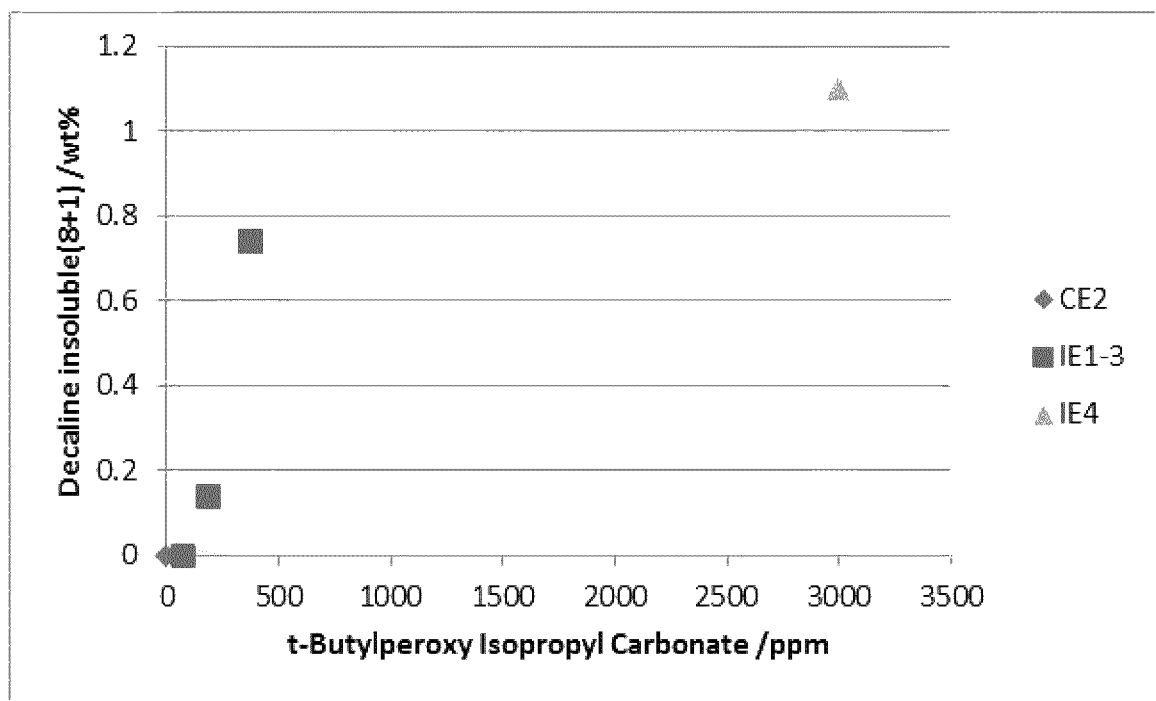
FIG. 2 shows the effect of the peroxide concentration on the gel content (decaline insoluble fraction) in peroxide-induced (grafting) reactions of RAHECO.

FIG. 2 shows the gel content (decaline insoluble fraction) of blends of VISICO-grafted RAHECO (red squares), similar blends with a PB masterbatch (green triangle) and an ungrafted blend of RAHECO and VISICO (blue diamond), as a function of the peroxide concentration. These data show that during the grafting reaction essentially no crosslinking of the VISICO-grafted RAHECO happens which is an advantage because crosslinking is undesirable at this stage.

Figure 3:
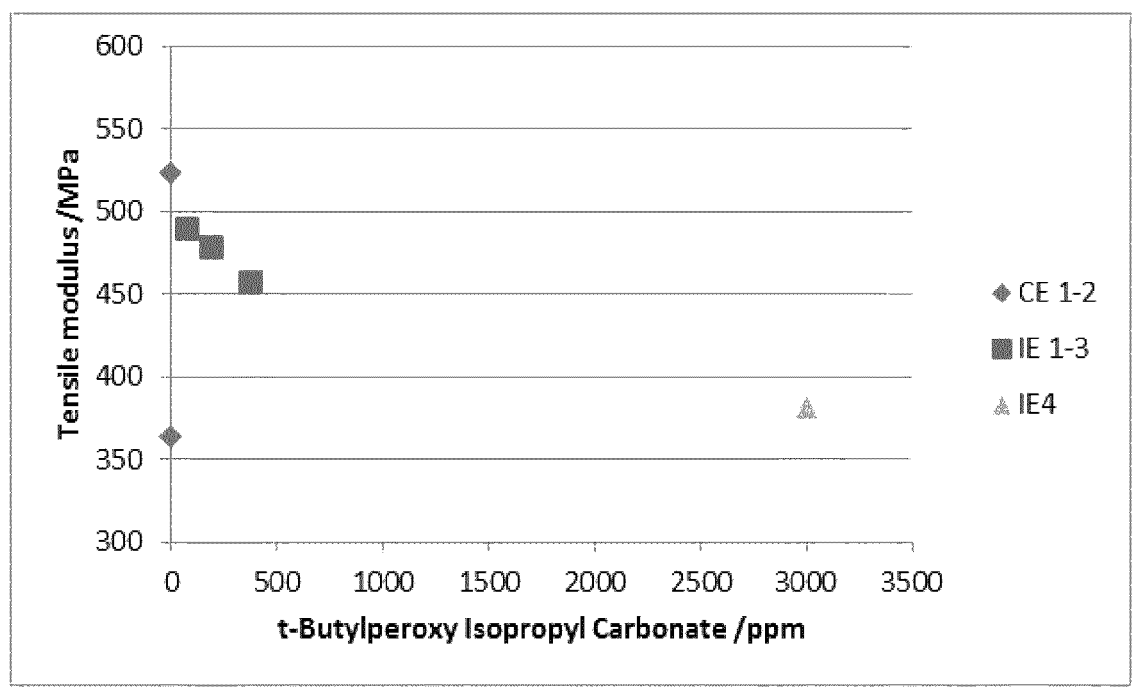
FIG. 3 shows the effect of the peroxide concentration on the tensile modulus of the RAHECO-VISICO blends.

FIG. 3 shows the tensile modulus of the RAHECO-VISICO blends, as a function of the peroxide concentration. The reacted blends have a lower tensile modulus, indicating higher flexibility, than the unreacted, thus ungrafted, physical blends of RAHECO and VISICO; adding a small amount of PB masterbatch reduces the tensile modulus further providing an easy way to tune the tensile modulus.

The invention claimed is:

1. A crosslinkable polyolefin composition comprising a silane-functionalized graft polymer obtained by grafting a hydrolysable silane functional polyolefin polymer B onto a polyolefin polymer (A) selected from the group consisting of a polyethylene homopolymer or polypropylene homo- or copolymer; the hydrolysable silane functional polyolefin polymer B is prepared from monomers comprising olefin monomers a) and silane functional compound(s) b).

2. The crosslinkable polyolefin composition according to claim 1 wherein the silane functional compound(s) b) are selected from the group of silane halides or silane functional compound(s) b) represented by the formula:

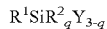

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y which may be the same or different is a hydrolysable organic group and q is 0, 1 or 2.

3. The crosslinkable polyolefin composition according to claim 1, wherein silane functional compound(s) b) are chosen from the group comprising gamma-(meth)acryloxypropyl trimethoxysilane, gamma-(meth)-acryl-oxypropyl triethoxysilane, and vinyl triacetoxysilane or combinations of two or more thereof.

4. The crosslinkable polyolefin composition according to claim 1, wherein polymer B further comprises one or more polar comonomer(s) c) selected from the group of (i) vinyl carboxylate esters, (ii) (meth)acrylates, (iii) olefinically unsaturated carboxylic acids, (iv) (meth)acrylic acid derivatives, (v) vinyl ethers.

5. The crosslinkable polyolefin composition according to claim 1, wherein the one or more polar comonomer(s) c) are selected from (C1-C6)-alkyl acrylate, or (C1-C6)-alkyl (C1-C6)-alkylacrylate.

6. The crosslinkable polyolefin composition according to claim 1, wherein polymer B comprises olefin monomers a), wherein olefin monomers a) are predominantly ethylene or propylene or both ethylene and propylene and further optional minor amounts of (vi) alpha-olefins, and (vi) aromatic vinyl compounds.

7. The crosslinkable polyolefin composition according to claim 1, wherein the amount (wt %) of the silane functional compound(s) b) relative to the total weight of polymer B is from 0.1 to 10.0 wt %, wherein the amount of polar comonomer(s) c) in the polymer B relative to the total amount (mol) of monomers in polymer B is from 2.5 to 18 mol %.

8. The crosslinkable polyolefin composition according to claim 1, wherein the polymer B is a copolymer obtained by polymerising monomers a), b) and optionally comonomer c) or wherein the polymer B is obtained by reacting a polymer comprising monomer a) and optionally comonomer c) with silane functional compound(s) b).

9. The crosslinkable polyolefin composition according to claim 1, wherein the polymer B comprises:
   a) between 77 and 97.1 mol % of an alkene, wherein the alkene has 2 to 8 carbon atoms,
   b) between 0.4 and 5 mol % of a vinyl trialkoxysilane, wherein the alkoxy groups have 1 to 8 carbon atoms and
   c) between 0 and 18 mol %, of an alkyl (alkyl-)acrylate, wherein the alkyl (alkyl-)acrylate is methyl (meth-)acrylate or ethyl (meth-)acrylate,
   wherein monomers a), b) and c) constitute at least 80 mol % of the random copolymer.

10. The crosslinkable polyolefin composition according to claim 1, comprising an amount of polymer B from 10 to 80 wt % relative to the total weight of polymers A and B.

11. The crosslinkable polyolefin composition according to claim 1, further comprising a silane condensation catalyst E, selected from the group comprising Lewis acids, inorganic acids, organic acids, organic bases and organometallic compounds.

12. A process for the preparation of a crosslinkable polyolefin composition according claim 1, comprising melt mixing the one or more polyolefin polymers A and the hydrolysable silane functional polyolefin polymer B, adding a radical initiator component C, optionally adding a polyunsaturated component D and optionally adding a silane condensation catalyst E.

13. A process for the manufacture of crosslinked product comprising:
   i. providing a crosslinkable polyolefin composition according to claim 1,
   ii. optionally shaping the crosslinkable polyolefin composition into a shaped article and
   iii. exposing the crosslinkable polyolefin composition to moisture.

14. A crosslinkable polyolefin composition comprising a silane-functionalized graft polymer obtained by grafting a hydrolysable silane functional polyolefin polymer B onto a heterophasic polypropylene (A); the hydrolysable silane functional polyolefin polymer B is prepared from monomers comprising olefin monomers a) and silane functional compound(s) b).

15. A crosslinkable polyolefin composition according to claim 14 wherein the amount of polymer B is from 5 to 55 wt % based on the total weight of polymers A and B.

* * * * *